3,074,791
HERBICIDE-FERTILIZER COMPOSITION
George W. Scoles, Hemlock, Mich., assignor to The Dow Chemical Company, Midland, Mich., a corporation of Delaware
No Drawing. Filed Nov. 12, 1959, Ser. No. 852,199
6 Claims. (Cl. 71—2.6)

This invention relates to mixtures of herbicides and liquid fertilizers. It more particularly relates to formulations containing phenoxy aliphatic carboxylic acid based herbicides which are stably emulsifiable in aqueous urea and urea-ammonium nitrate fertilizer solutions.

With the recent surge in use of liquid fertilizers as an effective means of supplying plant nutrients, interest has developed in the possibility of simultaneously applying both herbicides and liquid fertilizers from a common source to accomplish both crop fertilization and weed control in a single operation. Unfortunately, the widely used phenoxy aliphatic carboxylic acid based herbicides are most often prepared as water emulsifiable esters specifically designed for use with water as a spray or carrying medium. When these forms of the herbicides are admixed with an aqueous liquid fertilizer, e.g., urea or an urea-ammonium nitrate solution, poor physical emulsion stabiilty results. This mix instability, whereby the herbicidal member separates from the mixture, permits non-homogeneous distribution of the herbicide upon application and subsequently results in erratic and incomplete weed control. Continuous agitation of the herbicide-fertilizer mixture helps to keep the herbicide suspended in the fertilizer, but such stabilizing or mechanical dispersing means cannot always be utilized in practice. For example, airplane borne spray equipment does not ordinarily permit the installation or operation of extensive and complicated mixing apparatus. This problem of herbicidal emulsion instabiilty in aqueous liquid fertilizers now unexpectedly has been overcome by the present invention wherein herbicides of water emulsifiable esters of phenoxy aliphatic carboxylic acids are compounded into formulations which have excellent emulsion stability in aqueous liquid fertilizer compositions.

It is the principal object of this invention to provide a means of physically stabilizing water emulsifiable esters of phenoxy aliphatic carboxylic acids in aqueous liquid urea and urea-ammonium nitrate fertilizers. An advantage of this invention is that in a single operation plant food nutrient and herbicide can be uniformly and simultaneously applied to any given area. A second advantage is that the stabilized herbicide-fertilizer compositions are suitable for use both with aerial and ground spray techniques. Another advantage is that this invention permits stabilization of readily available herbicides in normally used aqueous liquid fertilizer solutions. A further advantage is that the formulations of this invention remain fluid to temperatures below zero degree Fahrenheit. Still other advantages and objects will be recognized from the description of the invention which follows.

According to this invention, a formulation containing a water emulsifiable phenoxy aliphatic acid ester herbicide, an emulsifying agent and a stabilizing agent is first prepared. This herbicidal formulation then is mixed with an aqueous liquid urea or urea-ammonium nitrate fertilizer solution and the resulting mixture blended into an emulsion.

The herbicidal formulations are comprised of a herbicide and a combination of an alkyl substituted phenolalkylene oxide condensate emulsifier plus a stabilizing agent selected from the group consisting of (1) fatty acids, (2) fractionated tall oils containing from about 20 to about 60 percent fatty acids, (3) glyceryl mono esters of fatty acids, (4) glycol mono esters of fatty acids and (5) polyglycol mono and poly esters of fatty acids.

In the alkyl substituted phenol-alkylene oxide condensates used as emulsifiers, the benzene ring substituted alkyl groups contain from 1 to about 6 carbon atoms. One or two groups can be substituted in the aromatic nucleus. Branched chain secondary or tertiary groups containing from 4 to 6 carbon atoms per group advantageously are used as nuclear substituents. The phenol-hydroxypolyalkylene oxide members are obtained by condensation of an alkyl phenol with propylene oxide followed by further reaction of the resulting condensate with ethylene oxide. Condensates useful as stabilizing agents contain hydroxypolyalkoxy groups resulting from condensation of about 4 to about 10 molecules of propylene oxide and about 13 to about 20 molecules of ethylene oxide with each molecule of the alkyl phenol. Desirably, these compounds will contain hydroxypolyalkoxy groups resulting from condensation of about 7 to 8 molecules of propylene oxide and about 15 to about 20 molecules of ethylene oxide condensed with each molecule of the alkyl phenol.

In the fatty acid containing stabilizing members, the fatty acids are saturated and unsaturated aliphatic carboxylic acids containing from about 6 to about 26 carbon atoms. The unsaturated acids can obtain one or more double bonds in the aliphatic carbon chain. Furthermore, substitutents, e.g. halogens and hydroxy groups can be substituted for 1 or more of the hydrogen members of the aliphatic hydrocarbon chain.

The ratio of phenol-alkylene oxide condensate to the fatty acid or fatty acid ester second member of the emulsifier-stabilizer combination can vary from 1:1 to about 1:3 or more on a weight basis, and the aggregate concentration of the combinations normally used is at least about 20 percent on the weight of the herbicide. For example, a stable emulsion of polypropylene glycol butyl ether ester of 2,4-dichlorophenoxy acetic acid in an aqueous urea-ammonium nitrate solution containing about 30 percent by weight dissolved urea and about 39.5 percent by weight dissolved ammonium nitrate results if the herbicide is stabilized using either of the following emulsifier-stabilizer combinations: (1) a condensate containing one molecule of disec. buytl phenol-8 molecules propylene oxide-17 molecules ethylene oxide (10 percent on weight of herbicide) plus fractionated tall oil containing about 70 percent resin acids and about 30 percent fatty acids (10 percent on weight of herbicide) or (2) a blend containing 5 percent (on weight of the herbicide) of the above described phenolic condensate and 15 percent (on weight of the herbicide) of the above identified tall oil. Higher concentrations of the herbicidal emulsion stabilizers can be used if desired.

Up to 10 percent or more (on total weight of the stabilized herbicidal formulation) of an inert diluent, e.g. heavy aromatic naphtha, mineral spirits or kerosene can be incorporated into the stabilizer containing herbicidal formulations if desired to extend the formulations and thereby reduce costs. Also, water miscible organic materials, e.g. alcohols, glycols, glycol ethers, esters, ketones, aldehydes and the like can be added in small amounts (from about 2 to about 10 percent on total weight) to the herbicidal formulations to aid in the initial emulsification of these formulations in various aqueous fertilizers.

Emulsion stability of phenoxy acetic acid ester herbicides is promoted by the present combinations in aqueous liquid urea solutions containing up to about 50 percent by weight dissolved urea. Emulsion stability also is found in aqueous liquid urea-ammonium nitrate solutions containing from about 35 to about 90 percent total dissolved solids and having urea-ammonium nitrate ratios from about 6:1 to about 0.4:1 wherein the urea content varies from about 25 to about 60 percent by weight and the ammonium nitrate content ranges from about 10 to about 60 percent by weight.

Ordinarily, the phenoxy acetic acid based herbicides as used in these formulations will be in the form of an emulsifiable ester, e.g. an iso-octyl acetate ester, butyl acetate ester and polypropylene glycol butyl ether acetate ester of 2,4-dichlorophenoxyacetic acid, 2,4,5-trichlorophenoxy acetic acid, 2-methyl-4-chlorophenoxy acetic, acid, 2,4-dichlorophenoxy propionic acid and 2,4-dichlorophenoxy butyric acid, but other emulsifiable forms of other herbicides of the same class can be used in these formulations.

The following examples will serve to further illustrate the invention, but are not meant to limit it thereto.

EXAMPLE 1

A herbicidal formulation containing polypropylene glycol butyl ether ester of 2,4-dichlorophenoxy acetic acid (56 percent by weight of total composition), a condensate of 1 part di-sec. butyl phenol-4 parts propylene oxide-12 parts ethylene oxide (20 percent by weight of total composition), a mixture of stearic acid and oleic acids (20 percent by weight of total composition) and isopropanol (4 percent by weight of total composition) was stirred into an excess of an aqueous fertilizer solution containing about 39.5 percent ammonium nitrate and about 30 percent urea by weight. The resulting emulsion was permitted to stand for a length of time, at least one hour, sufficient to have permitted the application of several hundred gallons of herbicide fertilizer mixture from a spray tank. No emulsion separation, or creaming, was found.

EXAMPLE 2

Using the same test procedure, fertilizer solution and phenoxy acetic acid ester herbicide as in Example 1, a herbicidal formulation was prepared which contained 70 percent by weight of the herbicide, 10 percent by weight of 1 part di-sec.butyl phenol condensed with 8 parts propylene oxide and 20 parts ethylene oxide, 5 percent by weight of tall oil fatty acids (oleic and linoleic), 5 percent by weight of tall oil resin (mixed abietic acids) and 10 percent by weight of heavy aromatic naphtha. This formulation when emulsified in an excess of the fertilizer showed no creaming after standing for one hour.

EXAMPLE 3

Using the same test procedure, fertilizer solution, phenoxy acetic acid ester herbicide and phenol-propylene oxide ethylene oxide condensate as in Example 2, a herbicidal formulation was prepared which contained 70 percent by weight of the herbicide, 10 percent by weight of the phenol-alkylene oxide condensate, 10 percent by weight of glyceryl mono laurate and 10 percent by weight isopropanol. This formulation when emulsified in an excess of the fertilizer showed no creaming after standing for one hour.

EXAMPLE 4

In a quantitative emulsion stability test, 3.75 milliliters of a herbicidal formulation composed of 70 percent of the herbicide described in Example 2, 5 percent of the phenol-alkylene oxide condensate of Example 2, 15 percent of fractionated tall oil (containing about 70 percent resin acids plus about 30 percent fatty acids) and 10 percent of heavy aromatic naphtha was emulsified into 100 milliliters of the liquid fertilizer described in Example 2. No separation of the emulsion was found after 30 minutes, and only 0.05 milliliter separation was found after 60 minutes.

EXAMPLE 5

The emulsion stability of a variety of herbicidal formulations in various aqueous urea and urea-ammonium nitrate fertilizer solutions was determined using the following uniform test procedure. A 100 milliliter sample of a liquid fertilizer was placed in an 8 ounce wide-mouthed, round, glass bottle. A direct drive 1/20 H.P. electric stirrer having a 3/4 in. diameter round washer rigidly affixed to the bottom of its shaft was inserted into the bottle. The stirrer was positioned so that the washer was essentially centered with respect to the side wall of the bottle, and was raised about 1/8 in. off of the bottom of the bottle. The fertilizer solution was stirred while 3.75 milliliters of a herbicidal formulation was pipetted into the solution. The herbicidal formulation-fertilizer mixture was emulsified by continuing the stirring for 5 minutes following completion of the herbicide addition. After this time the stirrer was removed from the bottle, and the resulting emulsion transferred to a cone-shaped centrifuge tube. The rate of separation, or emulsion creaming rate, of the emulsified herbicide formulation-fertilizer mixture was measured over a period of time. The results of a number of tests are summarized in Tables I and II. A herbicide-fertilizer ratio of 3.75 milliliters/100 milliliters was used in these quantitative studies, since these proportions are equivalent to a practical use concentration of about 1.5 U.S. pints of herbicide per 5 U.S. gallons of liquid fertilizer.

Table I shows the results of a series of tests evaluating the effect of varying the propylene oxide and ethylene oxide moieties of the phenol-alkylene oxide condensate on the emulsion stability of given herbicide formulation in a given liquid fertilizer.

Table II shows the results of tests run evaluating emulsion stability in fertilizer solutions wherein the urea-ammonium nitrate ratio and total dissolved solids content of the fertilizer solutions were varied.

Table I

EFFECT OF POLYALKOXY CONTENT OF EMULSIFIER IN HERBICIDAL FORMULATIONS ON THE SEPARATION RATES OR HERBICIDE-FERTILIZER MIXTURES [1]

| Moles Alkylene Oxide Condensed Per Mole Di-Sec. Butyl Phenol | | Emulsion Separation Rate—Milliliters Versus Time | | |
|---|---|---|---|---|
| Propylene Oxide | Ethylene Oxide | 10 Minutes—Ml. Separation Herbicidal Formulation | 30 Minutes—Ml. Separation Herbicidal Formulation | 60 Minutes—Ml. Separation Herbicidal Formulation |
| Control [2] | | 0.2 | 3.5 | 3.75 (complete). |
| 4 | [3] 5 | 0.5 | Complete | Complete |
| 4 | [3] 12 | 0.0 | 0.05 | 0.10 |
| 4 | 14 | 0.05 | 0.20 | 0.40 |
| 5 | [3] 10 | 2.40 | 3.50 | Complete |
| 5 | [3] 12 | 0.15 | 1.60 | Almost Complete |
| 7 | 15 | 0.0 | 0.0 | 0.0 |
| 8 | [3] 12 | 0.65 | 3.10 | Complete. |
| 8 | 14 | 0.25 | 2.00 | Almost Complete. |
| 8 | 17 | 0.0 | 0.0 | 0.0 |
| 8 | 20 | 0.0 | 0.0 | 0.0 |

[1] Herbicidal formulation: 70 percent polypropylene glycol butyl ether ester of 2,4-dichlorophenoxy acetic acid; 10 percent di-sec. butyl phenol-alkylene oxide condensate emulsifier; 10 percent glceryl mono ricinoleate emulsion stabilizer; 10 percent isopropanol. Fertilizer solution: 39.5 percent ammonium nitrate; 30.0 percent urea; 30.5 percent water. Herbicide—Fertilizer mixture composition: 3.75 milliliters herbicidal formulation/100 milliliters fertilizer solution.
[2] Polypropylene glycol butyl ether ester of 2,4-dichlorophenoxy acetic acid (3.75 milliliters) used as a commercial herbicide formulation, such as Esteron 1010, The Dow Chemical Company.
[3] Composition outside scope of present invention.

Table II
HERBICIDE¹-FERTILIZER EMULSION STABILITY IN AMMONIUM NITRATE-AREA LIQUID SOLUTIONS²

| Fertilizer Solution Composition | | | | | Volume of Cream Separation Vs. Time (Ml./Minutes) | | |
|---|---|---|---|---|---|---|---|
| $NH_4NO_3$ (percent) | Urea (percent) | $H_2O$ (percent) | Total Dissolved Solids | Urea/ $NH_4NO_3$ | 10 Minutes (Ml.) | 20 Minutes (Ml.) | 30 Minutes (Ml.) |
| 60 | ----- | 40.0 | 60 | -------- | 3 ml. in 5 min. | 3.25 | 3.5 |
| 41.7 | 25.0 | 33.3 | 66.7 | 0.6/1 | 0 | 0.1 | 0.15 |
| 62.7 | 25.0 | 12.5 | 87.5 | 0.4/1 | 0.4 | 1.7 | 2.5 |
| 39.5 | 30.0 | 30.5 | 69.5 | 0.76/1 | 0 | 0 | 0 |
| 55.4 | 33.3 | 11.3 | 88.7 | 0.6/1 | 0.1 | 0.5 | 1.6 |
| 32.3 | 33.7 | 34.0 | 66.0 | 1.04/1 | 0.1 | 0.3 | 0.5 |
| 44.2 | 46.3 | 9.5 | 90.5 | 1.05/1 | 0 | 0 | 0 |
| 18.9 | 47.0 | 35.2 | 65.9 | 2.5/1 | 0 | 0 | 0 |
| 0 | 50.0 | 50.0 | 50.0 | -------- | 0.01 | 0.12 | 0.3 |

¹ Herbicidal formulation: 70 percent polypropylene glycol butyl ether ester of 2,4-dichlorophenoxy acetic acid + 10 percent di-sec. butyl phenol + 8 propylene oxide + 20 ethylene oxide; 10 percent fractionated tall oil (70 percent resin acids + 30 percent fatty acids); 10 percent isopropanol.
² 3.75 ml. herbicidal formulation/100 ml. fertilizer solution.

In a manner similar to that described for the foregoing examples emulsions of herbicides stable in the aqueous liquid fertilizer solutions described heretofore can be prepared by blending, for example, (1) 70 parts isooctyl ester of 2,4-dichloropropionic acid, 15 parts of the condensation product of one mole of 1,1-dimethyl butyl phenol condensed with 7 moles propylene oxide and 15 moles ethylene oxide, and, 15 parts of glycol mono cerebronate, (2) 60 parts of the n-butyl ester of 2-methyl-4-chlorophenoxy acetic acid, 15 parts of the condensation product of one mole of 1-methylamyl phenol condensed with 7 moles of propylene oxide, and 20 moles ethylene oxide, 15 parts glyceryl arachidonate and 10 parts of amyl alcohol, (3) 75 parts of the propylene glycol butyl ether ester of 2,4,5-trichlorophenoxy acetic acid, 10 parts of the condensation product of one mole of di-sec.-butyl phenol condensed with 8 moles propylene oxide and 18 moles ethylene oxide, 10 parts of cerotic acid and 5 parts of mineral spirits, and (5) 70 parts of mixed isooctyl esters 2,4-dichlorophenoxy butyric acid, 10 parts of the condensation product of 1 mole di-sec. butyl phenol condensed with 7 moles propylene oxide and 14 moles ethylene oxide, 10 parts of a polyglycol ester of caproic acid and 10 parts heavy aromatic naphtha.

Any of the suggested herbicidal acid esters can be blended with any of the suggested phenol-alkylene oxide condensates and fatty acid containing stabilizing members to give herbicidal formulations which are emulsion stable in the previously described aqueous liquid fertilizers.

Various modifications can be made in the present invention without departing from the spirit or scope thereof for it is understood that I limit myself only as defined in the appended claims.

I claim:
1. A herbicidal formulation stably emulsifiable in aqueous urea fertilizers containing up to about 50 percent urea by weight, said formulation comprising in combination, a water emulsifiable ester of 2,4-dichlorophenoxy acetic acid herbicide, di-sec. butyl phenol condensed with from 7 to 8 molecules of propylene oxide and with from about 14 to about 20 molecules of ethylene oxide per molecule of said phenol, and a tall oil containing from about 20 to about 60 percent fatty acids, the ratio of the phenol condensate to the tall oil being about 1:1 on a weight basis, and the aggregate weight of said phenol condensate and said tall oil being at least 20 percent of the weight of said herbicide.

2. A herbicidal formulation stably emulsifiable in aqueous urea fertilizers containing up to about 50 percent urea by weight, said formulation comprising in combination, a water emulsifiable ester of 2,4-dichlorophenoxy acetic acid herbicide, di-sec. butyl phenol condensed with from 7 to 8 molecules of propylene oxide and with from about 14 to about 20 molecules of ethylene oxide per molecule of said phenol and, glyceryl mono laurate, the ratio of the phenol condensate to said glyceryl mono laurate being about 1:1 on a weight basis, and the aggregate weight of said phenol condensate and said glyceryl monolaurate being at least 20 percent of the weight of said herbicide.

3. A herbicidal formulation stably emulsifiable in aqueous urea fertilizers containing up to about 50 percent urea by weight, said formulation comprising in combination about 70 percent polypropylene glycol butyl ether ester of 2,4-dichlorophenoxy acetic acid, 10 percent di-sec. butyl phenol condensed with 8 molecules of propylene oxide and with 20 molecules of ethylene oxide per molecule of said phenol, 10 percent tall oil containing about 30 percent fatty acids and about 70 percent resin acids, and 10 percent isopropanol.

4. A physically stable fertilizer herbicidal emulsion which comprises in combination (1) an aqueous urea-ammonium nitrate fertilizer containing from about 35 to about 90 percent total dissolved solids, wherein the urea content of said fertilizer varies from about 25 to about 60 percent by weight, the ammonium nitrate content varies from about 10 to about 60 percent by weight and the urea-ammonium nitrate ratio in the mixture varies from about 6:1 to about 0.4:1, and (2) a herbicidal composition consisting essentially of (a) a water emulsifiable ester of 2,4-dichlorophenoxy acetic acid herbicide, (b) di-sec. butyl phenol condensed with from 7 to 8 molecules of propylene oxide and with from about 14 to about 20 molecules of ethylene oxide per molecule of said phenol, and, (c) a tall oil containing from about 20 to about 60 percent fatty acids, the ratio of the phenol condensate to the tall oil being about 1:1 on a weight basis, and the aggregate weight of said phenol condensate and said tall oil being at least 20 percent of the weight of said herbicide.

5. A physically stable fertilizer herbicidal emulsion which comprises in combination (1) an aqueous urea-ammonium nitrate fertilizer containing from about 35 to about 90 percent total dissolved solids, wherein the urea content of said fertilizer varies from about 25 to about 60 percent by weight, the ammonium nitrate content varies from about 10 to about 60 percent by weight and the urea-ammonium nitrate ratio in the mixture ranges from about 6:1 to about 0.4:1, and (2) a herbicidal composition consisting essentially of (a) a water emulsifiable ester of 2,4-dichlorophenoxy acetic acid herbicide, (b) di-sec.butyl phenol condensed with from 7 to 8 molecules of propylene oxide and with from about 14 to about 20 molecules of ethylene oxide per molecule of said phenol and, (c) glyceryl monolaurate, the ratio of the phenol condensate to said glyceryl monolaurate being about 1:1 on a weight basis, and the aggregate weight of said glyceryl monolaurate being at least 20 percent of the weight of said herbicide.

6. A physically stable fertilizer herbicidal emulsion which comprises in combination (1) an aqueous urea-ammonium nitrate fertilizer containing from about 35 to about 90 percent total dissolved solids, wherein the urea content of said fertilizer varies from about 25 to about 60 percent by weight, the ammonium nitrate content varies from about 10 to about 60 percent by weight and the urea-ammonium nitrate ratio in the mixtures ranges from about 6:1 to about 0.4:1, and (2) a herbicidal composition consisting essentially of (a) about 70 percent polypropylene glycol butyl ether ester of 2,4-dichlorophenoxy acetic acid, (b) about 10 percent di-sec. butyl phenol condensed with 8 molecules of propylene oxide and with 20 molecules of ethylene oxide per molecule of said phenol, (c) about 10 percent tall oil containing about 30 percent fatty acids and about 70 percent resin acids and (d) about 10 percent isopropanol.

References Cited in the file of this patent

UNITED STATES PATENTS

| | | |
|---|---|---|
| 2,022,677 | Kniskern et al. | Dec. 3, 1935 |
| 2,080,378 | Quinn | May 11, 1937 |
| 2,510,839 | Shmidt | June 6, 1950 |
| 2,668,104 | Eastman | Feb. 2, 1954 |
| 2,741,116 | Fookes | Apr. 10, 1956 |
| 2,770,538 | Vierling | Nov. 13, 1956 |
| 2,913,372 | Velde et al | Nov. 17, 1959 |

OTHER REFERENCES

Pollack in "Soap and Sanitary Chemicals," vol. 29, No. 5, May 1953, pages 42 to 45 incl.